(12) United States Patent
Cader et al.

(10) Patent No.: US 10,837,438 B2
(45) Date of Patent: Nov. 17, 2020

(54) PUMP BASED ISSUE IDENTIFICATION

(71) Applicant: Hewlett Packard Enterprise Development LP, Houston, TX (US)

(72) Inventors: Tahir Cader, Liberty Lake, WA (US); John Franz, Houston, TX (US); Sammy L. Zimmerman, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 229 days.

(21) Appl. No.: 15/569,249

(22) PCT Filed: Sep. 4, 2015

(86) PCT No.: PCT/US2015/048492
§ 371 (c)(1),
(2) Date: Oct. 25, 2017

(87) PCT Pub. No.: WO2017/039682
PCT Pub. Date: Mar. 9, 2017

(65) Prior Publication Data
US 2018/0112656 A1     Apr. 26, 2018

(51) Int. Cl.
F04B 49/06      (2006.01)
G06F 1/20       (2006.01)
F04B 49/02      (2006.01)

(52) U.S. Cl.
CPC ......... *F04B 49/065* (2013.01); *F04B 49/02* (2013.01); *G06F 1/20* (2013.01); *G06F 2200/201* (2013.01)

(58) Field of Classification Search
CPC .......... F04B 49/02; F04B 49/065; G06F 1/20; G06F 2200/201
See application file for complete search history.

(56) References Cited

U.S. PATENT DOCUMENTS

| 5,117,677 | A | * | 6/1992 | Hendershot | G01M 3/32 340/605 |
| 6,679,202 | B2 | | 1/2004 | Nakano | |
| 6,937,963 | B2 | | 8/2005 | Ishii | |

(Continued)

FOREIGN PATENT DOCUMENTS

| CA | 2527563 A1 | 3/2006 |
| CN | 101874161 A | 10/2010 |

(Continued)

OTHER PUBLICATIONS

Schwerdt, H., et al.; Application of Ferrofluid as a Valve/pump for Polycarbonate Microfluidic Devices:, Aug. 15, 2006; 17 pages.

(Continued)

*Primary Examiner* — Michael J Dalbo
(74) *Attorney, Agent, or Firm* — Brooks, Cameron & Huebsch, PLLC

(57) ABSTRACT

In one example implementation pump based issue identification includes monitoring a total number of operational cycles of a vacuum pump associated with a cooling device, comparing the total number of operational cycles to an operational cycle threshold, identify an issue based on the comparison of the total number of operational cycles to the operational cycle threshold, and generating a notification in response to identifying the issue.

17 Claims, 3 Drawing Sheets

(56) References Cited

U.S. PATENT DOCUMENTS

| | | | |
|---|---|---|---|
| 7,195,036 B2 | 3/2007 | Burns | |
| 7,436,666 B1 | 10/2008 | Konshak | |
| 7,969,736 B1 | 6/2011 | Iyengar et al. | |
| 8,493,735 B2 | 7/2013 | Iijima | |
| 8,739,605 B2 | 6/2014 | McLain | |
| 2003/0172882 A1 | 9/2003 | Nakano | |
| 2008/0294382 A1 | 11/2008 | Lim | |
| 2009/0216910 A1 | 8/2009 | Duchesneau | |
| 2010/0246117 A1 | 9/2010 | Brunschwiler et al. | |
| 2011/0110043 A1 | 5/2011 | Iijima | |
| 2012/0180979 A1* | 7/2012 | Harrington | F28D 1/0246 165/11.1 |
| 2012/0209569 A1 | 8/2012 | Becourt | |
| 2012/0324985 A1 | 12/2012 | Gu et al. | |
| 2013/0030641 A1* | 1/2013 | Olsen | G07C 5/085 701/31.6 |
| 2014/0095049 A1 | 4/2014 | Jentz et al. | |
| 2014/0124188 A1* | 5/2014 | Xu | F28F 27/00 165/281 |
| 2014/0138399 A1* | 5/2014 | Estelle | B05C 5/0225 222/1 |
| 2014/0251583 A1 | 9/2014 | Eriksen | |
| 2016/0161952 A1* | 6/2016 | Buvid | G01M 3/40 700/282 |
| 2018/0112656 A1 | 4/2018 | Cader et al. | |

FOREIGN PATENT DOCUMENTS

| | | |
|---|---|---|
| CN | 103718218 | 4/2014 |
| CN | 103813688 A | 5/2014 |
| CN | 103835931 A | 6/2014 |
| CN | 104037103 A | 9/2014 |
| CN | 104477158 A | 4/2015 |
| EP | 0440320 A1 | 8/1991 |
| EP | 1297730 B1 | 9/2005 |
| EP | 3271798 A1 | 1/2018 |
| JP | 2013-224752 A | 10/2013 |
| KR | 20070087139 | 8/2007 |
| WO | WO-2012170802 | 12/2012 |
| WO | 2017/039682 A1 | 3/2017 |

OTHER PUBLICATIONS

International Search Report and Written Opinion received for PCT Patent Application No. PCT/US2015/048495, dated Jun. 3, 2016, 10 pages.

International Search Report and Written Opinion received for PCT Patent Application No. PCT/US2015/048492, dated Jun. 3, 2016, 10 pages.

International Preliminary Report on Patentability received for PCT Patent Application No. PCT/US2015/048495, dated Mar. 15, 2018, 9 pages.

International Preliminary Report on Patentability received for PCT Patent Application No. PCT/US2015/048492, dated Mar. 15, 2018, 9 pages.

European Search Report and Search Opinion Received for EP Application No. 15903252.3, dated Mar. 12, 2018, 6 pages.

European Search Report and Search Opinion Received for EP Application No. 15903251.5, dated Oct. 11, 2018, 8 pages.

* cited by examiner

PUMP BASED ISSUE IDENTIFICATION

BACKGROUND

Computing systems can include cooling systems that can include cooling devices such as a thermal busbar. The thermal busbar can include a number of cooling elements to maintain computing components at an operating temperature. It can be desirable to maintain functionality of the thermal busbar through long periods of usage since thermal busbar failures may result in damaged computing components due to overheating.

DETAILED DESCRIPTION

Computing systems can utilize a thermal busbar for cooling computing components. The thermal busbar can utilize a number of pumps and valves to control liquid flow between components of the computing system and/or maintain components such as cooling fluid conduits at a vacuum state. The thermal bus bar and/or the number of pumps and valves may encounter issues over an operational lifetime thereof. For example, a pump may experience an issue (e.g., not function as intended) and/or a component such as a cooling fluid conduit in communication with a pump may experience an issue (e.g., develop a leak). However, detecting an actual occurrence of an issue, let alone, predicting when an issue may occur may be difficult.

Accordingly, a number of methods, systems, and computer readable medium for pump based issue identification are described herein. Pump based issue identification can in various examples include monitoring a total number of operational cycles of a vacuum pump associated with a cooling device, comparing the total number of operational cycles to an operational cycle threshold, identifying identify an issue based on the comparison of the total number of operational cycles to the operational cycle threshold, and generating a notification in response to identifying the issue. The issue can be an issue with a vacuum pump and/or an issue with a cooling system (e.g., a leak in a cooling device of the cooling system) including a monitored vacuum pump. Such pump based issue identification can facilitate performing of preventative maintenance and/or ordering of replacement parts that can mitigate and/or eliminate failures of the pump and/or the cooling device to thereby avoid providing inadequate cooling capacity and/or inadequate cooling to a device cooled by the cooling device.

Notably, the pumps can be vacuum pumps. A vacuum pump evacuates air and/or liquids from a cavity to maintain the cavity at a vacuum state (e.g., a partial vacuum state) below an ambient pressure surrounding the cavity. For example, some or all of a cooling device employing a vacuum pump can be maintained at a vacuum state through operation of the vacuum pump. For instance, a cooling fluid conduit included in a cooling device can desirably be maintained at a vacuum state to promote cooling of a cooling fluid contained in the cooling fluid conduit and/or to promote insulating qualities associated with the cooling fluid conduit.

Figure 1:
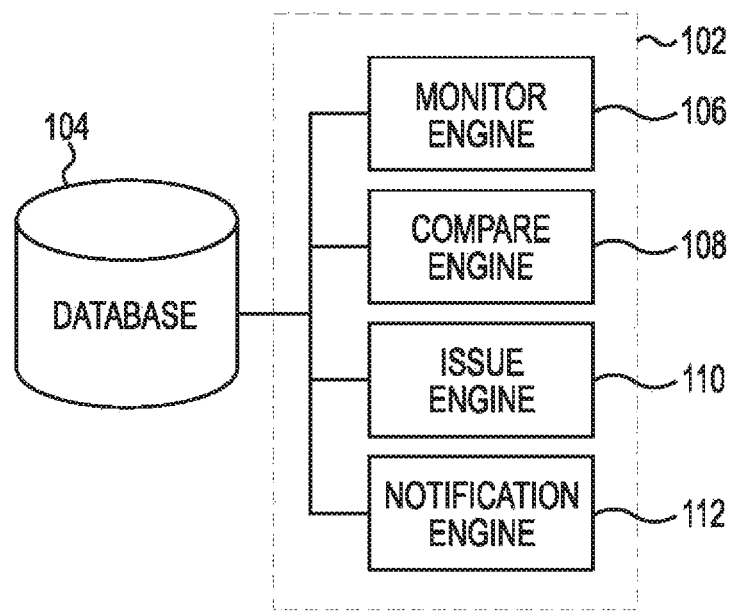
FIG. 1 illustrates a diagram of an example of a system for pump based issue identification consistent with the disclosure.
Figure 2:
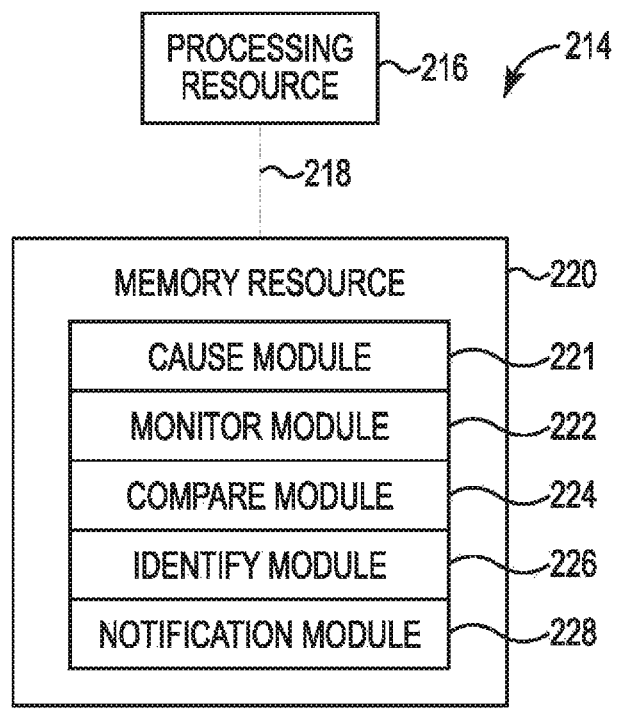
FIG. 2 illustrates a diagram of an example computing device for pump based issue identification consistent with the disclosure.

FIGS. 1 and 2 illustrate examples of system 100 and computing device 214 consistent with the disclosure. FIG. 1 illustrates a diagram of an example of a system 100 for pump based issue identification consistent with the disclosure. The pump based issue identification system 102 can include the database 104 and/or can be in communication with the database 104 via a communication link, and can include the number of engines (e.g., monitor engine 106, compare engine 108, issue engine 110, notification engine 112). The pump based issue identification system 102 can include additional or fewer engines that are illustrated to perform the various functions as described herein.

The number of engines (e.g., monitor engine 106, compare engine 108, issue engine 110, notification engine 112) can include a combination of hardware and instructions, but at least hardware, that is to perform functions described herein (e.g., monitor a total number of operational cycles of a vacuum pump associated with a cooling device, compare the total number of operational cycles to an operational cycle threshold, identify an issue based on the comparison of the total number of operational cycles to the operational cycle threshold, etc.) stored in a memory resource (e.g., computer readable medium, machine readable medium, etc.) as well as hard-wired instructions (e.g., logic).

The monitor engine 106 can include hardware and/or a combination of hardware and instructions, but at least hardware, to monitor a total number of operational cycles of a vacuum pump associated with a cooling device. The total number of operational cycles refers to a total number of on and off state cycles of a vacuum pump. Put another way, each operational cycle is a combination of an on state and off state cycle of the vacuum pump. Each operational cycle has a respective duration beginning when a vacuum pump enters an on state and ending when the vacuum pump enters an off state.

A vacuum pump can perform a total number of operational cycles to evacuate air from a cooling fluid conduit and/or a cooling fluid reservoir of a cooling device, among other possible applications. That is, as used herein, when a vacuum pump is in an on state the vacuum pump is to evacuate gas (e.g., air) and/or liquid from a cavity. For example, a vacuum pump can evacuate air from a cooling fluid conduit of the cooling device. As used herein, when the vacuum pump is in an off state the vacuum pump does not evacuate gas and/or liquid from a cavity. As mentioned, an operational cycle can include an occurrence of the vacuum pump being in an on state and an occurrence of the vacuum pump being in an off state. In this manner, a total number of operational cycles of the vacuum pump, a frequency of operation of the vacuum pump, and/or duration of an operational cycle can be monitored, among other possibilities.

The operational cycles of the vacuum pump can be monitored directly via a sensor associated with the vacuum pump and/or indirectly via various suitable measurements. For instance, an operational cycle of the vacuum pump can be monitored indirectly by measuring pressure and/or temperature changes (e.g., by measuring absolute values of pressures and/or temperatures) of a cooling fluid conduit to infer that a vacuum pump is in an on state and/or an off state.

The total number of operational cycles can be a total number operational cycles of a vacuum pump over a course of an operational lifetime of the vacuum pump and/or can be a total number of operational cycles of the vacuum pump over some other period of time (e.g., a day, a week, etc.). For example, a total number of operation cycles can be a cumulative total number of operational cycles over an operational lifetime of a vacuum pump. However, the disclosure is not so limited. Rather, a period of time can be specified by a user or otherwise specified to obtain a frequency of operation of a vacuum pump (e.g., by dividing a total number of operational cycles by a period of time). That is, the monitor engine 106 can, in some examples, monitor a total number of operational cycles over a period of time to obtain a frequency of operation of a vacuum pump.

Such frequency of operation information can promote pump based issue identification. For instance, when a frequency of operation of a vacuum pump is less than an intended frequency of operation (e.g., a baseline frequency threshold) that can indicate a particular type of issue such as the there being a relatively large leak in a cooling fluid conduit in communication with the vacuum pump. That is, when a relatively large leak (e.g., in terms of volume of air in/out flow) is present in a cooling device (e.g., in a cooling fluid conduit included in the cooling device) then a vacuum pump may have difficulties and/or be unable to maintain the cooling device and/or the cooling fluid conduit at a vacuum state. In such an example, the frequency of operation that is less than an intended frequency of operation may be due to remaining in an on state for a longer duration of time than intended (e.g., remaining in the on state and not entering an off state) in an effort to maintain the cooling device and/or the cooling fluid conduit at a vacuum state and/or account for an inflow of air introduced via the relatively large leak.

Similarly, when a frequency of operation of the vacuum pump is greater than an intended frequency of operation (e.g., an upper frequency threshold) that may indicate a particular type of pump issue such as the there being a relatively small leak in a cooling fluid conduit in communication with the pump. For instance, a greater frequency of operation may be due to cycling from an on state to an off state more frequently than intended in an effort to maintain the pump cooling device and/or the cooling fluid conduit at a vacuum state and account for an inflow of air introduced via the relatively small leak (e.g., as compared to a large leak that would result in the pump remaining on and not entering an off state in an effort to account for the large leak).

The intended frequency of operation can be specified by a user and/or correspond to an intended frequency of operation provided by a manufacturer (e.g., a manufacturer of a vacuum pump). Similarly, an intended duration of an operational cycle and/or an intended total number of operational cycles for an operational lifetime of a vacuum pump can be specified by a manufacturer. Such information can correspond to various thresholds.

An operational cycle threshold refers to an intended total number of operational cycles. The operation cycle threshold can be specified for an operational lifetime of a vacuum pump and/or can be specified for a particular period of operation of the vacuum pump (e.g., a total number of operational cycles of a vacuum pump occurring during a particular week of operation of the vacuum pump.).

A duration threshold refers to an intended duration of a particular operational cycle of a vacuum pump. For instance, a duration threshold can be a particular amount of time (e.g., 2 minutes) that a vacuum pump is intended to remain in an on state prior to entering an off state. A cycle frequency threshold refers to an intended frequency of operation of a vacuum pump. The frequency threshold can be equal to an intended frequency of operation provided by a manufacturer (e.g., 4 cycles per hour) however the disclosure is not so limited. That is the frequency threshold, along with the other thresholds described herein can be set by a user for instance based on a particular application and/or cooling device in communication with a vacuum pump and/or can be equal to a value provided by a manufacturer, among other possibilities.

In some examples, the monitor engine can monitor respective durations of each of the operational cycles performed by the vacuum pump. In this manner, when a respective duration of an operational cycle satisfies a duration threshold a notification can be generated and/or sent, for instance, to notify a user that the duration threshold has been satisfied, as described herein.

The temperature of the liquid exiting the cooling device can be monitored by a number of temperature sensors. In some examples, the cooling device can be a thermal busbar that utilizes a number of wax valves to control liquid circulation and cooling of a number of devices (e.g., computing components, etc.) within a computing system (e.g., computer, server, rack server, etc.).

As mentioned, a vacuum pump can perform a total number of operational cycles such as those monitored by a monitor engine 108 to evacuate air from a cooling fluid conduit (e.g., a cooling fluid conduit including cooling fluid) of the cooling device. The compare engine 108 can include hardware and/or a combination of hardware and instructions, but at least hardware, to a compare engine to compare the total number of operational cycles to an operational cycle threshold. As detailed herein with respect of FIG. 3, in some examples the compare engine 108 can compare a total number of operational cycles of a vacuum pump to an operational cycle threshold in response to the vacuum pump entering an on state.

The compare engine 108 can compare a total number of operational cycles to an operational cycle alert threshold, an operational cycle alarm threshold, and/or an operational cycle off threshold. For instance, the compare engine 108 can compare a total number of operational cycles to each of an operational cycle alert threshold, an operational cycle alarm threshold, and/or an operational cycle off threshold. The operational cycle alert threshold, an operational cycle alarm threshold, and an operational cycle off threshold can be tiered thresholds having comparatively increasing degrees of severity and/or comparatively increased corresponding numerical values. For instance, an operational cycle alert threshold may have a severity and a numerical value (e.g., 1000 operational cycles) that is comparatively less than a severity and a numerical value (e.g., 2000 operational cycles) of an operational cycle alarm threshold. In some examples, the compare engine 108 can compare a frequency of operational cycles of a vacuum pump to a frequency alert threshold, a frequency alarm threshold, and/or a frequency off threshold. Similarly, the compare engine 108 can compare a respective duration of an operational cycle of a vacuum pump to a duration alert threshold, a duration alarm threshold, and/or duration off threshold.

The issue engine 110 can include hardware and/or a combination of hardware and instructions, but at least hardware, to an issue engine to identify an issue when the total number of cycles satisfies the operational cycle threshold. For example, the issue engine 110 can identify an issue when the frequency of operation of the vacuum pump satisfies either a baseline operational threshold (e.g., a baseline frequency threshold) or an upper operational threshold (e.g., an upper frequency threshold, among other possible thresholds. The issue engine 110 can, in some examples, identify an issue with a vacuum pump and/or with a cooling device when a frequency of operation of the vacuum pump satisfies an upper frequency threshold. Similarly, the issue engine 110 can identify an issue with a vacuum pump and/or with a cooling device when the frequency of operation of the vacuum pump is less than the baseline frequency threshold. That is, an intended operating range of a pump can be bounded by an upper frequency threshold and/or a baseline frequency threshold in order to promote pump based issue identification as described herein.

In some examples, the issue engine 110 can identify an issue when a respective duration of an operational cycle, such as those monitored by the monitor engine 106, satisfies a duration threshold. The duration threshold is satisfied when a respective duration of an operation cycle is equal to or greater than a value (e.g., 2 minutes) of the duration threshold. An operational cycle having a longer than intended duration can indict the presence of a large leak and/or a plurality of small leaks, among other possibilities.

The notification engine 112 can include hardware and/or a combination of hardware and instructions, but at least hardware, to generate a notification in response to identification of the issue. For instance, a notification can be generated that is suitable to notify a user when a vacuum pump and/or a cooling device is malfunctioning. The notification engine 112 can generate and/or send a notification to a user based on a type of issue identified. For example, the notification engine 112 can send an alert to a user and/or trigger an alarm notification that can alert a user. In some examples, operation of a device can be stopped, for instance in response to an off operational cycle threshold being satisfied to prevent overheating and/or damage to the device.

The operational cycle alert threshold, an operational cycle alarm threshold, and an operational cycle off threshold can each have a respective notification associated therewith. For example, when a cycle alert threshold is satisfied an alert notification can be sent. Similarly, when an operational cycle alarm threshold and/or an operational cycle off threshold is satisfied an alarm and/or cycle off notification can be sent. Moreover, when an operational cycle off threshold is satisfied a vacuum pump can be caused to enter an off state by a user or automatically (e.g., without an interaction from a user).

In some examples, the system 100 can include a cause engine (not shown) to cause a vacuum pump to perform operational cycles to evacuate air from a cooling fluid conduit of a cooling device. Causing the vacuum pump to perform operational cycles can include communication of instructions to cause the vacuum pump to perform operational cycles and/or communication of instructions to another device with an expectation that the another device communicates instructions to the vacuum pump to cause the vacuum pump of perform operational cycles.

FIG. 2 illustrates a diagram of an example computing device for pump based issue identification consistent with the disclosure. The computing device 214 can utilize software, hardware, firmware, and/or logic to perform functions described herein. The computing device 214 can be a combination of hardware and instructions to share information. The hardware, for example, can include a processing resource 216 and/or a memory resource 220 (e.g., computer-readable medium (CRM), machine readable medium (MRM), database, etc.). A processing resource 216, as used herein, can include any number of processors capable of executing instructions stored by a memory resource 220. Processing resource 216 may be implemented in a single device or distributed across multiple devices. The instructions (e.g., computer readable instructions (CRI)) can include instructions stored on the memory resource 220 and executable by the processing resource 216 to implement a desired function (e.g., cause a vacuum pump to perform operational cycles to evacuate air from a cooling fluid conduit of a cooling device, monitor a total number of the operational cycles of the vacuum pump, compare the total number of the operational cycles to an operational cycle threshold, identify an issue based on the comparison of the total number of operational cycles to the operational cycle threshold (e.g., identify an issue when the total number of cycles satisfies the operational cycle threshold), and generate a notification in response to identification of the issue, etc.).

The memory resource 220 can be in communication with a processing resource 216. A memory resource 220, as used herein, can include any number of memory components capable of storing instructions that can be executed by processing resource 216. The memory resource 220 can be a non-transitory CRM or MRM. The memory resource 220 may be integrated in a single device or distributed across multiple devices. Further, memory resource 220 may be fully or partially integrated in the same device as processing resource 216 or it may be separate but accessible to that device and processing resource 216.

The memory resource 220 can be in communication with the processing resource 216 via a communication link (e.g., a path) 218. The communication link 218 can be local or remote to a machine (e.g., a computing device) associated with the processing resource 216. Examples of a local communication link 218 can include an electronic bus internal to a machine (e.g., a computing device) where the memory resource 220 is one of volatile, non-volatile, fixed, and/or removable storage medium in communication with the processing resource 216 via the electronic bus.

A number of modules (e.g., cause module 221, monitor module 222, compare module 224, identify module 226, notification module 228) can include CRI that when executed by the processing resource 216 can perform functions. The number of modules (e.g., the cause module 221, monitor module 222, compare module 224, identify module 226, notification module 228) can be sub-modules of other modules. For example, the monitor module 222 and the compare module 224 can be sub-modules and/or contained within the same computing device. In another example, the number of modules (e.g., the cause module 221, monitor module 222, compare module 224, identify module 226, notification module 228) can comprise individual modules at separate and distinct locations (e.g., CRM, etc.).

Each of the number of modules (e.g., cause module 221, monitor module 222, compare module 224, identify module 226, notification module 228) can include instructions that when executed by the processing resource 216 can function as a corresponding engine as described herein. For example, the monitor module 222 can include instructions that when executed by the processing resource 216 can function as the monitor engine 106.

Figure 3:
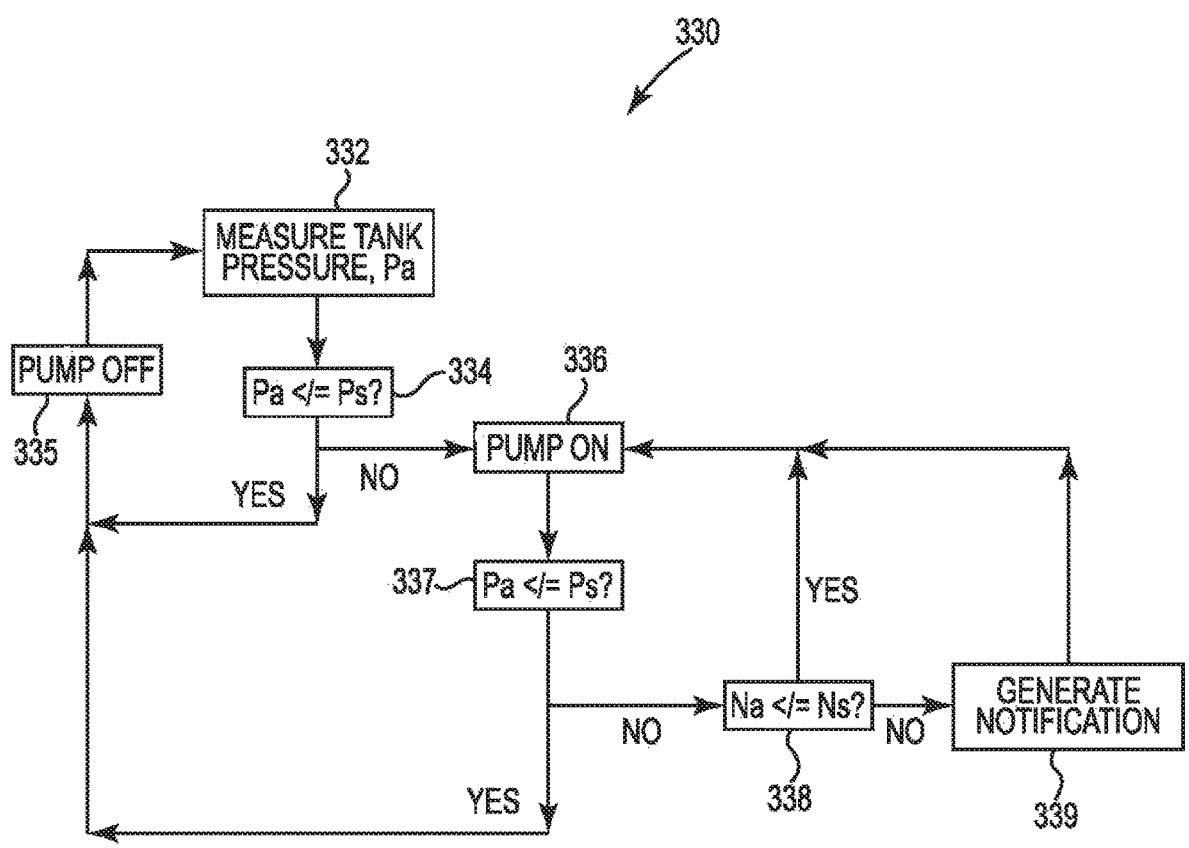
FIG. 3 illustrates a schematic flow chart of an example of a method for pump based issue identification consistent with the disclosure.

FIG. 3 illustrates a schematic flow chart of an example of a method for pump based issue identification consistent with the disclosure. The method 330 can be executed by a computing system such as system 102 as referenced in FIG. 1 and/or a computing device such as computing device 214 as referenced in FIG. 2.

In some examples, the method 330 can be utilized for a thermal busbar cooling device that utilizes a vacuum pump to maintain cooling fluid conduits included in the thermal bus bar and/or coupled to the thermal bus bar at a vacuum state. The method 330 can include measuring a tank pressure associated with the vacuum pump as illustrated at 332. Measuring the tank pressure can include measuring an actual pressure (Pa) of a tank such as an air separation tank coupled to a vacuum pump. For example, the method 330 can include measuring the actual pressure of a volume of air and/or other gases and/or liquids included in a tank. The pressure can be measured via a number of sensors coupled to the tank and/or conduits coupled to the tank. That is, the tank and/or the vacuum pump can be coupled to a thermal bus bar to maintain the thermal bus bar and/or cooling fluid conduits at a vacuum state.

At 334, the method 330 can include comparing the actual pressure (Pa) with a pressure set-point (Ps). The pressure set-point can correspond to a pressure or value that represents a pressure at which the tank and/or the thermal bus bar is intended to be maintained. Based on the comparison, the vacuum pump coupled to the tank can enter an on state as illustrated at 336 or enter an off state (e.g., remain in an off state) as illustrated at 335, among other possibilities. For instance, when the actual pressure is greater than the pressure set-point, the method 330 can cause a vacuum pump to perform an operational cycle by placing the vacuum pump in an on state (i.e., pump on) or when the actual pressure is less than or equal to the pressure set-point the method can cause a vacuum pump to enter an off state.

At 337, the method 330 can include comparing an actual pressure (Pa) with a pressure rate set-point (Ps), similar to the comparison performed at 334. Based on the comparison at 337 the vacuum pump coupled to the tank can remain in an on state and the method can proceed to 338 or the vacuum pump can enter an off state, as illustrated at 335, among other possibilities.

At 338 a number of vacuum pump operational cycles (Na) (e.g., a total number of operational cycles) can be compared to a set-point number of vacuum pump operational cycles (Ns). The number of operational cycles can be equal to a sum of a number of times a vacuum pump goes from an on state to an off state. That is, as mentioned each operational cycle includes an on state and off state of the vacuum pump. Based on the comparison at 338 the vacuum pump can remain in an on state (e.g., when the set-point pressure is less than or equal to an actual pressure) and the method can proceed to 336 or a notification can be generated as illustrated at 339. As described herein, comparing the number of the operational cycles to an operational cycle threshold can facilitate by identifying an issue with a vacuum pump and/or a cooling device coupled to the vacuum pump based on such a comparison.

The method can include continuing operation of the vacuum pump in an on state in response to generating the notification at 339 or can include causing the vacuum pump to enter an off state in response to generating the notification (e.g. when a cycle off notification is generated). The method 330 can provide alerts to users or devices to identify issues early enough to allow for pre-emptive maintenance to be scheduled on the vacuum pump and/or the cooling device. The method 330 can allow for maintenance to be completed before damage to the vacuum pump and/or cooling device occurs.

Figure 4:
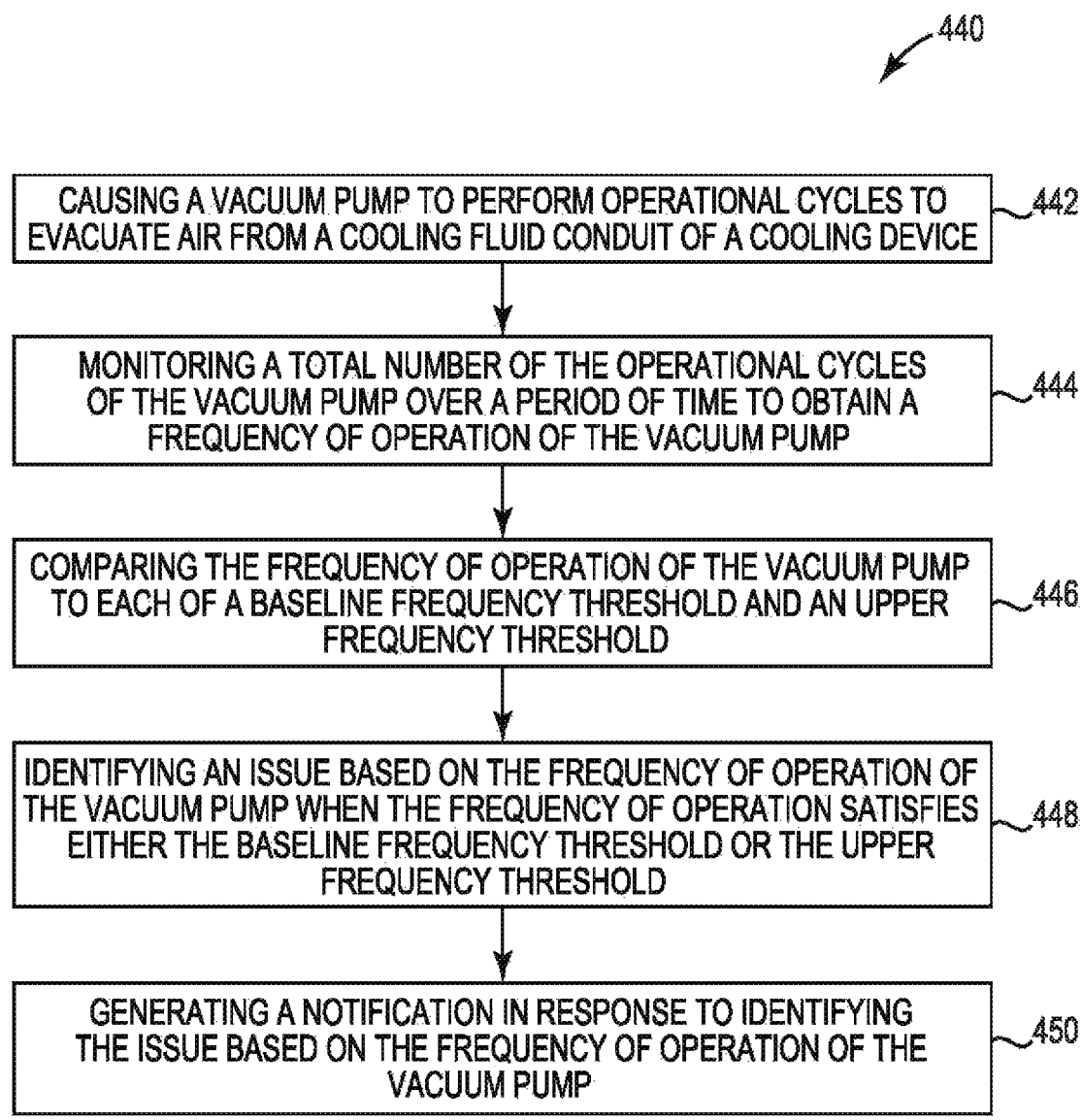
FIG. 4 illustrates a flow chart of an example of a method for pump based issue identification consistent with the disclosure.

FIG. 4 illustrates a flow chart of an example of a method for pump based issue identification consistent with the disclosure. The method 440 can be implemented by a system or computing device as described herein. As illustrated at 442, the method 440 can include causing a vacuum pump to perform operational cycles to evacuate air from a cooling fluid conduit of a cooling device. As mentioned, causing refers to causing the vacuum pump to perform operational cycles can include communication of instructions to cause the vacuum pump to perform operational cycles and/or communication of instructions to another device with an expectation that the another device communicates instructions to the vacuum pump to cause the vacuum pump of perform operational cycles.

The method 440 can include monitoring a total number of the operational cycles of the vacuum pump over a period of time to obtain a frequency of operation of the vacuum pump, as illustrated at 444. As illustrated at 446, the method 440 can include comparing the frequency of operation of the vacuum pump to each of a baseline frequency and an upper threshold frequency. In some examples, the method 440 can include comparing a total number of operational cycles to each of an operational cycle alert threshold, an operational cycle alarm threshold, and an operational cycle off threshold. The method can include comparing a total number, a frequency, and respective durations of operational cycles a baseline threshold and/or to an upper threshold. For instance, the method can include comparing a frequency of operation of a vacuum pump to both a baseline frequency threshold and a upper frequency threshold. In some examples, either the baseline frequency threshold or the upper frequency threshold can be satisfied when the frequency of operation of the vacuum pump is less than the baseline frequency threshold or when the frequency of operation of the vacuum pump is greater than the upper frequency threshold.

The method 440 can include identifying an issue when the frequency of operation of the vacuum pump satisfies either the baseline frequency threshold or the upper frequency threshold, as illustrated at 448. As illustrated at 450, the method 440 can include generating a notification in response to identifying the issue, as described herein. For example, generating a notification can include generation of and/or sending an alert sent to the user, an alarm sent to a user, and/or an off instruction sent to a user and/or a vacuum pump, among other possibilities.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a number of" something can refer to one or more such things. For example, "a number of widgets" can refer to one or more widgets.

The above specification, examples and data provide a description of the method and applications, and use of the system and method of the disclosure. Since many examples can be made without departing from the spirit and scope of the system and method of the disclosure, this specification merely sets forth some of the many possible example configurations and implementations.

What is claimed:
1. A system, comprising:
 a monitor engine to monitor a total number of operational cycles of a vacuum pump associated with a cooling device over a period of time to obtain a frequency of operation of the vacuum pump;

a compare engine to compare the frequency of operation of the vacuum pump to each of a lower baseline frequency threshold and an upper frequency threshold;

an issue engine to identify an issue based on the frequency of operation of the vacuum pump when the frequency of operation of the vacuum pump satisfies either the lower baseline frequency threshold or the upper frequency threshold, wherein the lower baseline frequency threshold is satisfied when the frequency of operation of the vacuum pump is less than the lower baseline frequency threshold; and a notification engine to generate a notification in response to identification of the issue.

2. The system of claim 1, wherein a cause engine causes the vacuum pump to perform the total number of operational cycles to evacuate air from a cooling fluid conduit of the cooling device.

3. The system of claim 1, wherein the compare engine compares the total number of operational cycles to an operational cycle threshold in response to the vacuum pump entering an on state.

4. The system of claim 1, wherein the identified issue is an issue with the cooling device.

5. The system of claim 1, wherein the identified issue is an issue with the vacuum pump.

6. The system of claim 1, wherein the upper frequency threshold is satisfied when the frequency of operation of the vacuum pump is greater than the upper frequency threshold.

7. A non-transitory computer readable medium storing instructions executable by a processor, wherein the instructions are executable to:

cause a vacuum pump to perform operational cycles to evacuate air from a cooling fluid conduit of a cooling device;

monitor a total number of the operational cycles of the vacuum pump over a period of time to obtain a frequency of operation of the vacuum pump;

compare the frequency of operation of the vacuum pump to each of a lower baseline frequency threshold and an upper frequency threshold;

identify an issue based on the comparison of the frequency of operation of the vacuum pump when the frequency of operation satisfies either the lower baseline frequency threshold or the upper frequency threshold, wherein the lower baseline frequency threshold is satisfied when the frequency of operation of the vacuum pump is less than the lower baseline frequency threshold; and generate a notification in response to identification of the issue.

8. The non-transitory computer readable medium of claim 7, including instructions to monitor respective durations of each of the operational cycles performed by the vacuum pump.

9. The non-transitory computer readable medium of claim 8, including instructions to identify an issue when a respective duration of an operational cycle satisfies a duration threshold.

10. The non-transitory computer readable medium of claim 7, wherein each operational cycle includes an on state and an off state of the vacuum pump.

11. The non-transitory computer readable medium of claim 7, wherein the upper frequency threshold is satisfied when the frequency of operation of the vacuum pump is greater than the upper frequency threshold.

12. The non-transitory computer readable medium of claim 7, wherein the identified issue is an issue with the cooling device or the vacuum pump.

13. A method, comprising:

causing a vacuum pump to perform operational cycles to evacuate air from a cooling fluid conduit of a cooling device;

monitoring a total number of the operational cycles of the vacuum pump over a period of time to obtain a frequency of operation of the vacuum pump;

comparing the frequency of operation of the vacuum pump to each of a lower baseline frequency threshold and an upper frequency threshold;

identifying an issue based on the frequency of operation of the vacuum pump when the frequency of operation satisfies either the lower baseline frequency threshold or the upper frequency threshold, wherein the lower baseline frequency threshold is satisfied when the frequency of operation of the vacuum pump is less than the lower baseline frequency threshold; and generating a notification in response to identifying the issue based on the frequency of operation of the vacuum pump.

14. The method of claim 13, including comparing the frequency of operational cycles to each of a frequency alert threshold, a frequency alarm threshold, and a frequency off threshold.

15. The method of claim 13, wherein the generated notification includes at least one of:

an alert notification sent to a user;

an alarm notification sent to a user; and an off notification sent to the vacuum pump to turn the vacuum pump off.

16. The method of claim 13, wherein the upper frequency threshold is satisfied when the frequency of operation of the vacuum pump is greater than the upper frequency threshold.

17. The method of claim 13, wherein the identified issue is an issue with the cooling device or the vacuum pump.

* * * * *